(12) United States Patent
Anderson

(10) Patent No.: US 7,530,369 B2
(45) Date of Patent: May 12, 2009

(54) ONE-WAY ELASTOMER VALVE

(76) Inventor: Lance E. Anderson, 2885 Country Dr., #190, St. Paul, MN (US) 55117

(*) Notice: Subject to any disclaimer, the term of this patent is extended or adjusted under 35 U.S.C. 154(b) by 126 days.

(21) Appl. No.: 11/523,231

(22) Filed: Sep. 19, 2006

(65) Prior Publication Data

US 2008/0066815 A1     Mar. 20, 2008

(51) Int. Cl.
*F16K 15/14* (2006.01)
(52) U.S. Cl. .................................... 137/846; 137/843
(58) Field of Classification Search ............... 123/566, 123/567; 128/200.26, 205.24; 137/102, 137/493, 512.4, 565.17, 588, 590, 843, 844, 137/846, 847, 849, 845; 141/309; 217/103; 222/105, 107, 108, 142.5, 209, 333, 481.5, 222/494, 63; 239/576; 251/144, 149.6, 152, 251/342, 368, 64.21
See application file for complete search history.

(56) References Cited

U.S. PATENT DOCUMENTS

| | | | | |
|---|---|---|---|---|
| 4,084,606 A * | 4/1978 | Mittleman | ................... | 137/102 |
| 5,398,853 A * | 3/1995 | Latham | ...................... | 222/491 |
| 6,086,612 A * | 7/2000 | Jansen | ........................ | 623/2.17 |
| 6,136,253 A * | 10/2000 | Bennett | ................... | 264/328.1 |
| 7,011,094 B2 * | 3/2006 | Rapacki et al. | ........ | 128/207.15 |

* cited by examiner

*Primary Examiner*—John Rivell
*Assistant Examiner*—Macade Brown
(74) *Attorney, Agent, or Firm*—D L Tschida

(57) ABSTRACT

A low-profile one-way valve assembly that attaches to a liquid conduit. A valve fitting supports a recessed, bi-leaflet, elastomer valve piece. A compound curvature at a valve base, raised seal forming surfaces at provided leaflets, tapered extension surfaces at the leaflets and a tailored sidewall thickness profile at the leaflets assures a durable watertight sealing action at the flexible valve piece. An O'ring mounted to a threaded fitting surface seals the assembly relative to a supporting conduit. A cover is also provided to protect the valve piece from external damage and significant back pressures.

6 Claims, 11 Drawing Sheets

ONE-WAY ELASTOMER VALVE

BACKGROUND OF THE INVENTION

The present invention relates to an elastomer valve and, in particular, to a one-way, bi-leaflet (e.g. duck-bill shaped) valve assembly that mounts to liquid conduits, such as flow ports located below other elevated system conduits or a reservoir and from which it is periodically necessary to clear latent fluid (e.g. when winterizing water lines for swimming pools, recreation vehicles and vacation properties).

Numerous one way valve devices are known for use in wide varieties of plumbing applications and systems. The present valve assembly in one construction is used to facilitate and overcome problems encountered when winterizing swimming pools.

Winterizing swimming pool plumbing lines typically requires the draining of the pool water below the level of the return openings, such as at the skimmers or pool sidewalls, to assure that no water enters or backs-up into the lines as they are seasonally drained, filled with anti-freeze and/or plugged. Such drainage wastes water and treatment chemicals. Reduced water levels can also produce cover damage such as where the pool has an automatic covering system.

For systems where the water level is not reduced, plugs can be added to the submerged ports as air is blown through the ports, but which can be unpleasant due to the attendant splashing that occurs as the plugs are inserted.

One valve that can be added to conduits that require seasonal clearing is disclosed at U.S. Pat. No. 6,877,524 and application publication US2004/0177882 to Vasilev. The valve of the subject invention can also be used in the foregoing applications and others where a one-way flow valve is desired. The valve finds particular application at submerged ports to permit expelling latent liquid and prevent backflow from low pressure surrounding water.

In one preferred form, the valve provides a support fitting having a suitable fastener coupling (e.g. threaded or adhesive) that mounts to an associated conduit. An elastomer duck-bill shaped valve piece mounts in the fitting. The valve piece is shaped to promote a flexing when mounted to the fitting to induce provided leaflets into abutting engagement in a closed condition, except when liquid or air is expelled from the conduit. Under forward pressure, the valve piece flexes open. Otherwise, the leaflets are constructed to resiliently close upon themselves with the release of pressure to maintain a flexible aperture in a closed condition to resist counter flow. A cap that mates with the fitting is provided as a cover to the valve piece to further assure against reverse flow.

SUMMARY OF THE INVENTION

It is a primary object of the invention to provide a one-way valve that opens with suitable liquid or air pressure and self-closes upon the cessation of the pressure.

It is a further object of the invention to provide a valve assembly that when submerged prevents back flow into an associated submerged conduit.

It is a further object of the invention to provide elastomeric valves that readily install to ports or openings of a plumbing system that return water to a reservoir (e.g. pool, spa etc.) from a pump and/or filtration equipment below the water line of the reservoir.

It is a further object of the invention to provide a valve assembly that supports a cover piece for the valve to protect the valve from physical damage, such as with ice movement or other physical abuse.

It is a further object of the invention to provide a resilient valve piece having a molded configuration that flexes to promote the closure of a flexible aperture defined by valve piece leaflets upon attachment to a fitting.

It is a further object of the invention to provide an elastomeric valve piece having surfaces of varying contours, thickness profiles and shapes to provide a sharp, clean seal parting line to prevent leakage.

The foregoing objects, advantages, distinctions and improvements of the invention, along with variously considered improvements and modifications are described with respect to one considered valve assembly having utility for winterizing swimming pools. This assembly provides a low-profile fitting that attaches to a conduit and supports an elastomer, duck-bill shaped valve piece that is recessed into the fitting. A flanged surface at the valve piece and an O'ring at a male, threaded surface of the fitting seals the assembly relative to a liquid conduit. A cover is provided that mounts over the elastomer valve piece to cover and protect the valve piece from external damage.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

Figure 1:
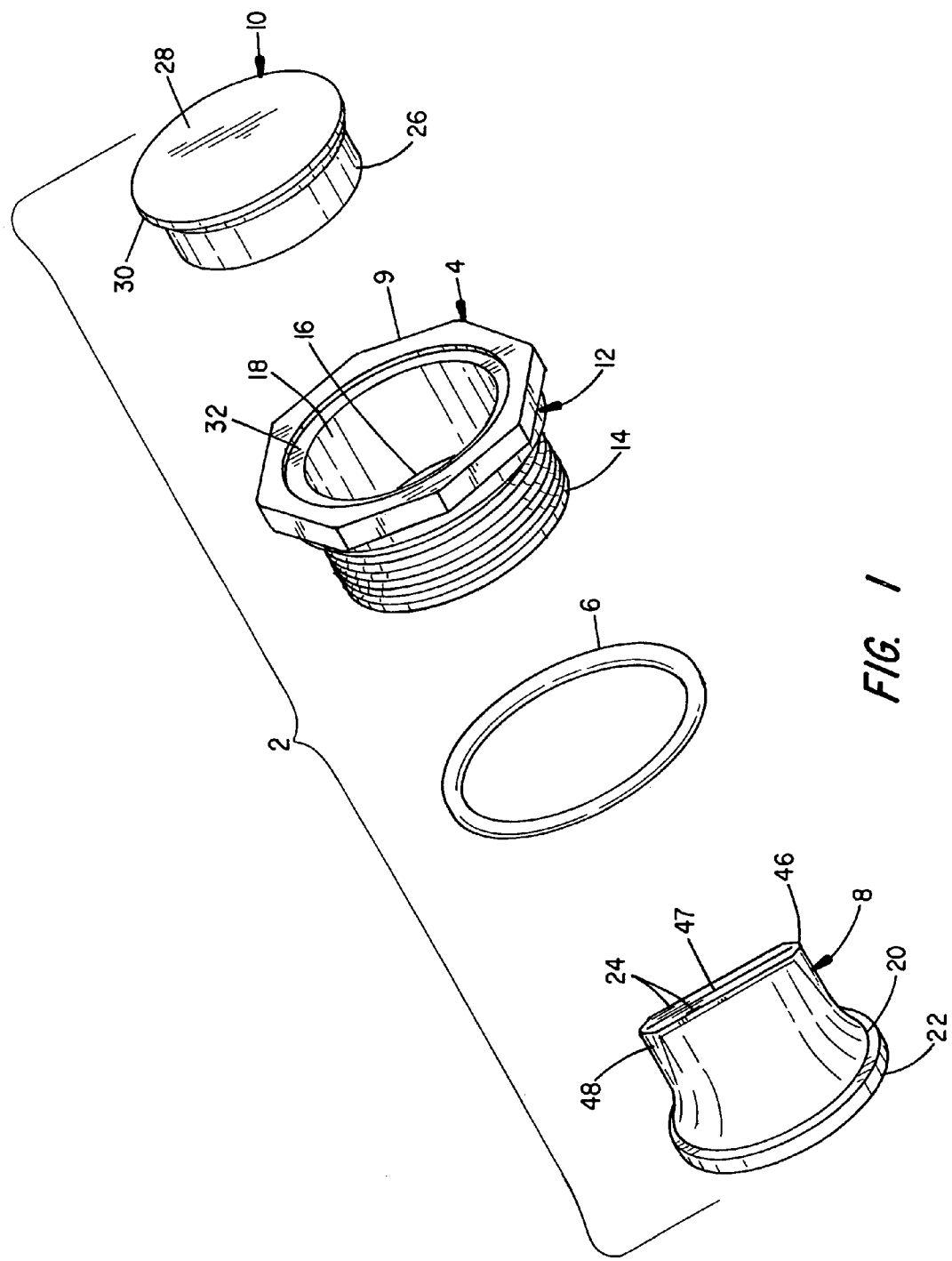
FIG. 1 is a perspective drawing shown in exploded assembly to one valve assembly of the invention.

Similar structure throughout the drawings is referred to with the same alphanumeric reference numerals and/or characters.

DESCRIPTION OF THE PREFERRED EMBODIMENT

Figure 2:
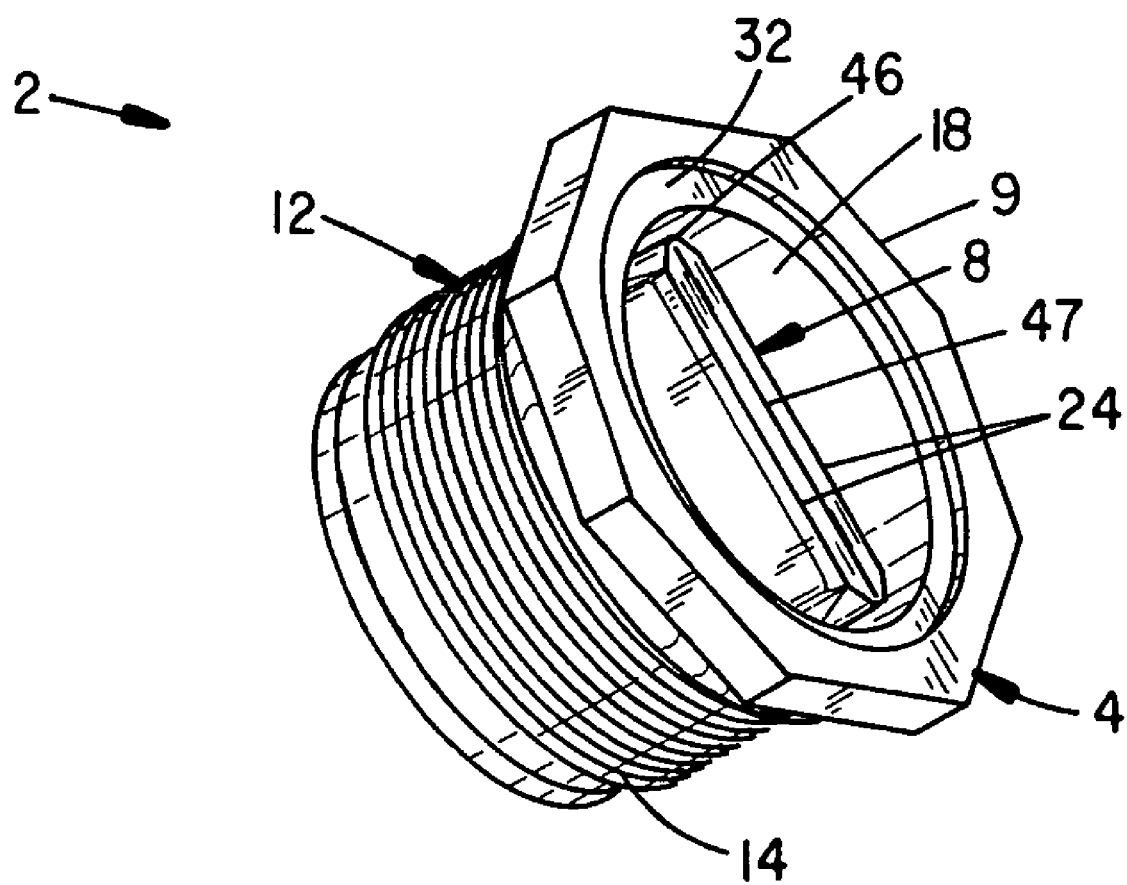
FIG. 2 is a perspective drawing showing an assembled view of the valve assembly of the invention
Figure 3:
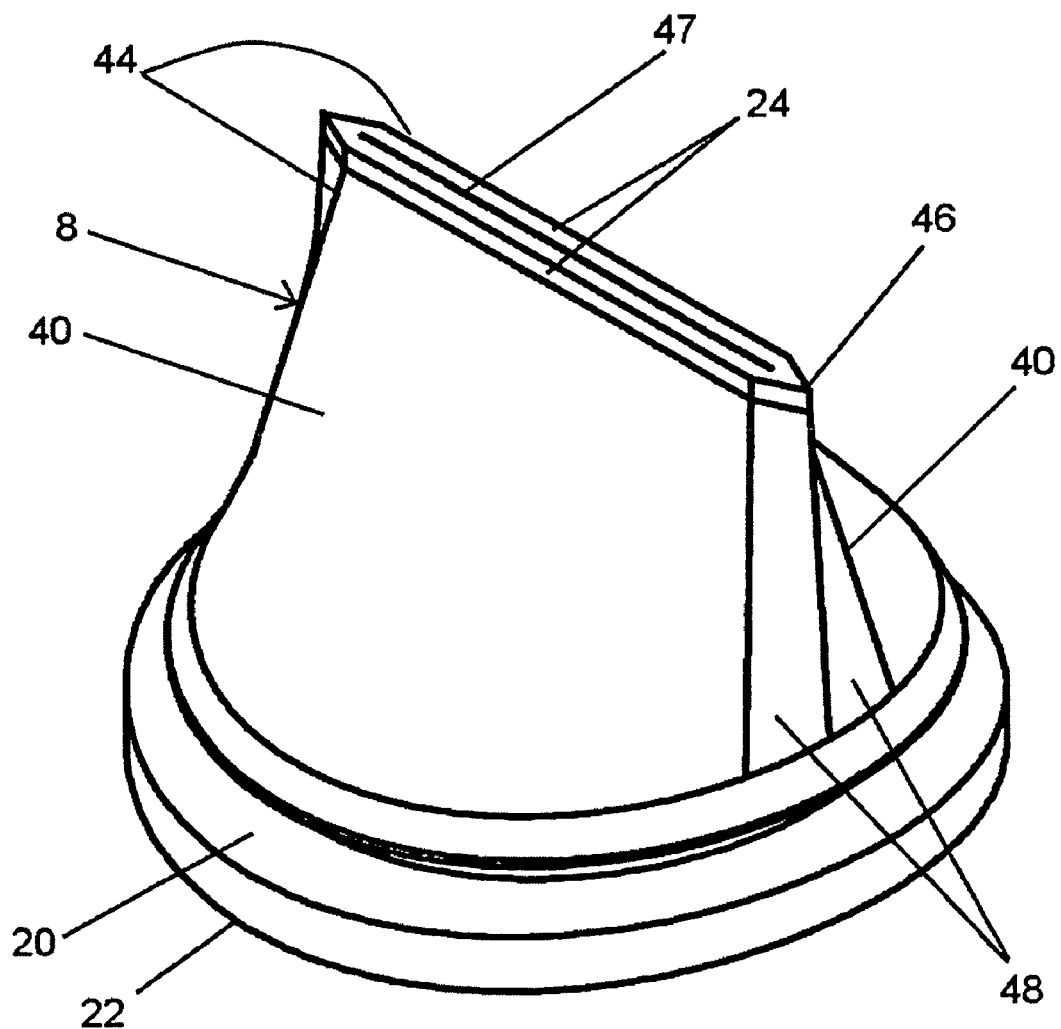
FIG. 3 is a perspective drawing to a duck-bill shaped elastomer valve piece removed from an associated fitting.

Referring to FIG. 1, a perspective view is shown to a one-way valve assembly 2 that includes a support fitting 4, an O'ring 6 for sealing the fitting 4 to a mating fitting, conduit, coupler or surface, a resilient elastomer, duck-bill shaped, bi-leaflet valve piece 8 and a valve piece cover 10. In an assembled condition shown at FIG. 2, the valve piece 8 mounts in the fitting 4 and a distal end of the valve piece extends approximately to a octagon tool surface 9 of the fitting 4. The assembly 2 finds particular application for winterizing liquid conduits such as found in swimming pools, whirlpools, spas or other fixtures and having a submerged conduit port that must be seasonally purged of liquid. The assembly 2 may also be used in other applications, such as winterizing plumbing conduits at recreation properties or the like to facilitate liquid purging and prevent access to the conduit interior by mice or unwanted materials (e.g. dirt, leaves etc.) or the like.

The fitting 4 is presently constructed as a body piece 12 having external threads 14 that mates with a female outlet port (not shown) that commonly extends from the sidewall of a swimming pool. The body piece 12 is molded from a suitable plastic (e.g. PVC, nylon or other high density material).

A flange 16 radiates from interior of the body 14 at an aft end of a central bore 18. The flange 16 couples to an annular groove 20 provided at the valve piece 8. Upon fitting the valve piece 8 into the fitting 4, an aft surface 22 of the valve piece 8 acts as a washer to capture the valve piece 8 to the fitting 4 and/or seal against an abutting bore or end surface at a mating coupler fitting, reference FIG. 2. The O'ring 6 can enhance the liquid seal with a mating coupler or independently seal the fitting 4 to the mating coupler. Once mounted to the fitting 4, distal, leaflet edges 24 of the valve piece 8 are nested and recessed into the bore 18 and flex into sealed abutment. The fitting 4 thereby physically protects the valve piece 8.

The cover 10 can be mounted and captured to the bore 18 to physically protect the valve piece 8. A sidewall surface 26 is sized to mount within the bore 18 and a cap surface 28 mounts over the seated valve piece 8. A peripheral flanged edge surface 30 mates and interlocks with a recess 32 let into the fitting 4. Collectively, the valve piece 8 and cover 10 effectively seal an associated liquid conduit port, when submerged against backflow and physical damage.

Turning attention to FIGS. 3 through 10, details are shown to the construction of the elastomer valve piece 8 and related unique and novel features. From FIG. 3, sidewalls 40 of the valve piece 8 project with a convex taper from the annular groove 20 and annular flanged aft end 22 of the valve piece 8 to the parallel, seal forming leaflet edges 24. The sidewall surfaces 40 project from the end 22 at intersecting angles in the range of 35 to 45°.

The valve piece 8 thus presents a duck-bill shape. It is to be appreciated however that other shapes might be adapted into the valve piece 8, provided the peripheral edges and/or included leaflet surfaces 24 are constructed to expand and contract to a sealed condition. The valve piece 8 can also be constructed with different numbers of leaflets and/or can be constructed with one or more of the following seal enhancing features.

Figure 4:
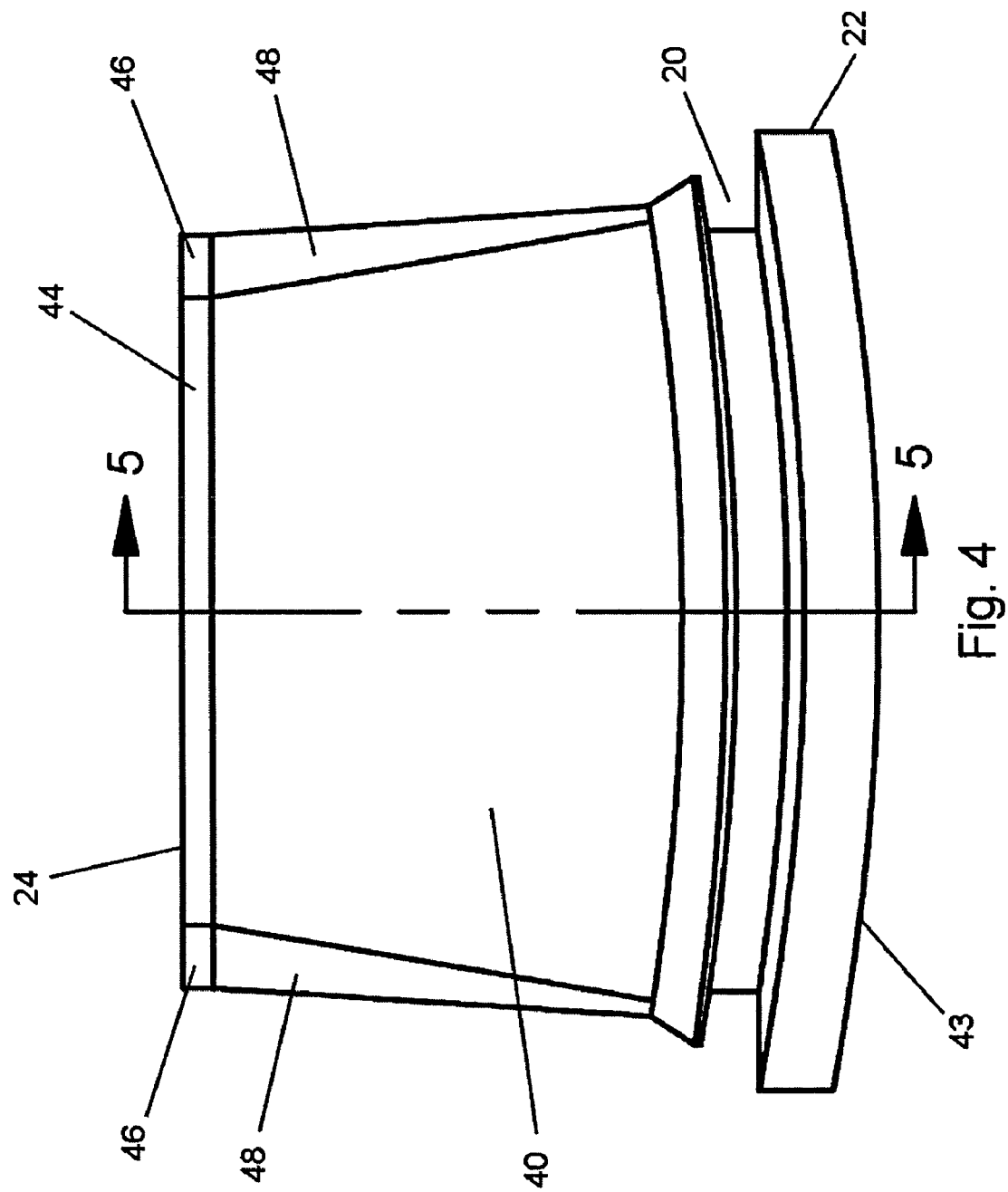
FIG. 4 is a front view to the duck-bill shaped elastomer valve piece of FIG. 3.
Figure 5:
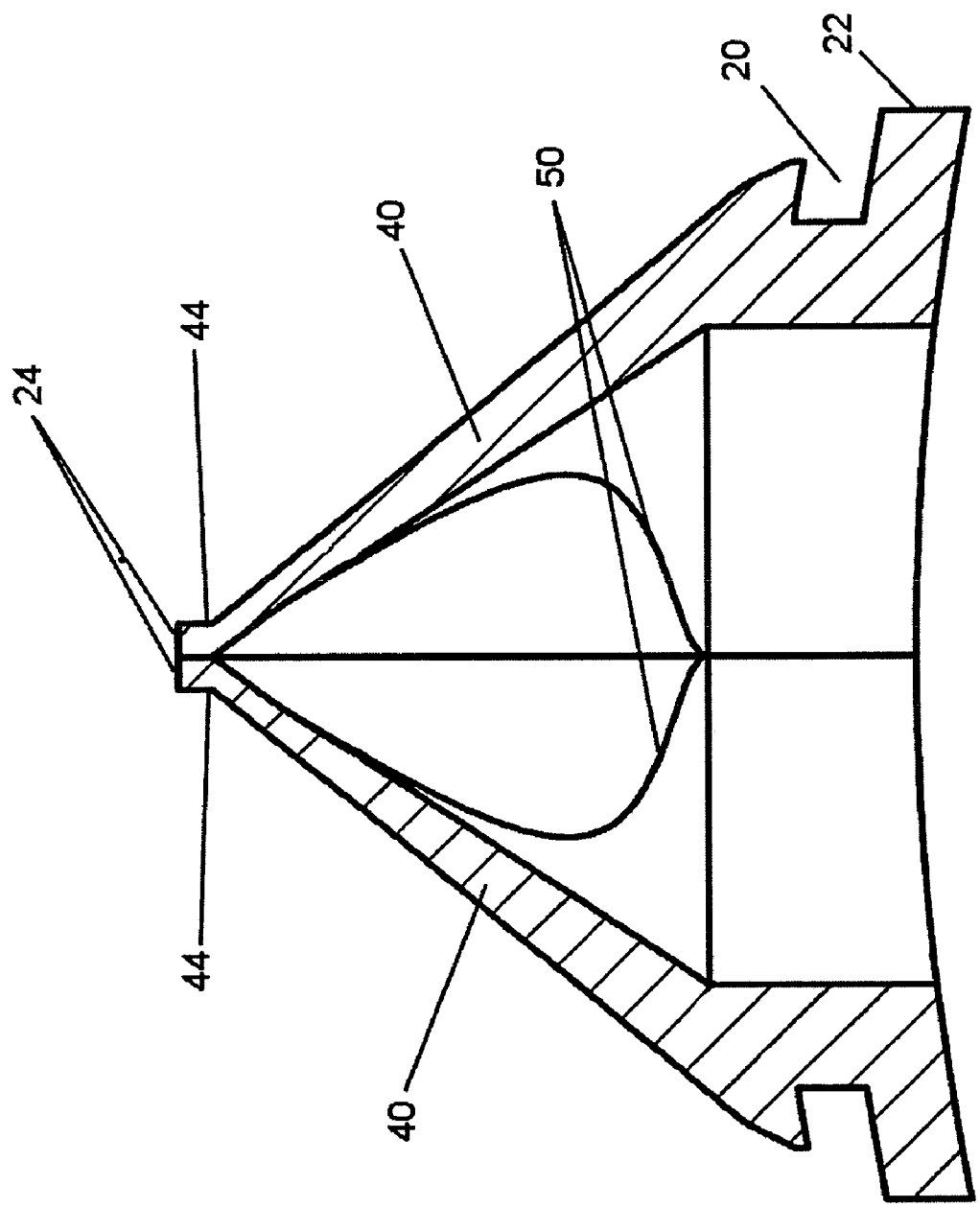
FIG. 5 is a section view to the duck-bill shaped elastomer valve piece of FIG. 2 taken along section lines 5-5 of FIG. 4.
Figure 6:
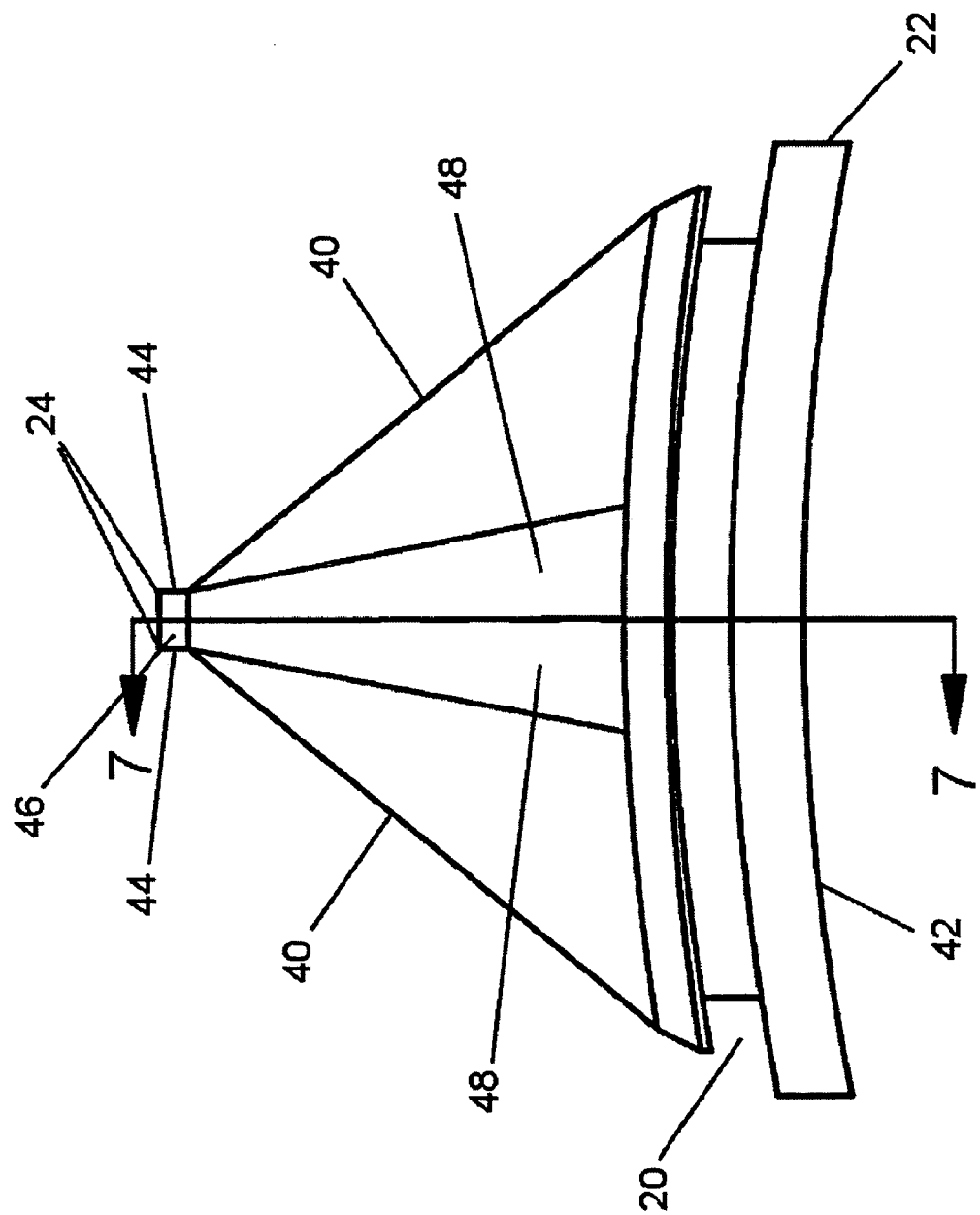
FIG. 6 is a side view to the duck-bill shaped elastomer valve piece of FIG. 3.
Figure 7:
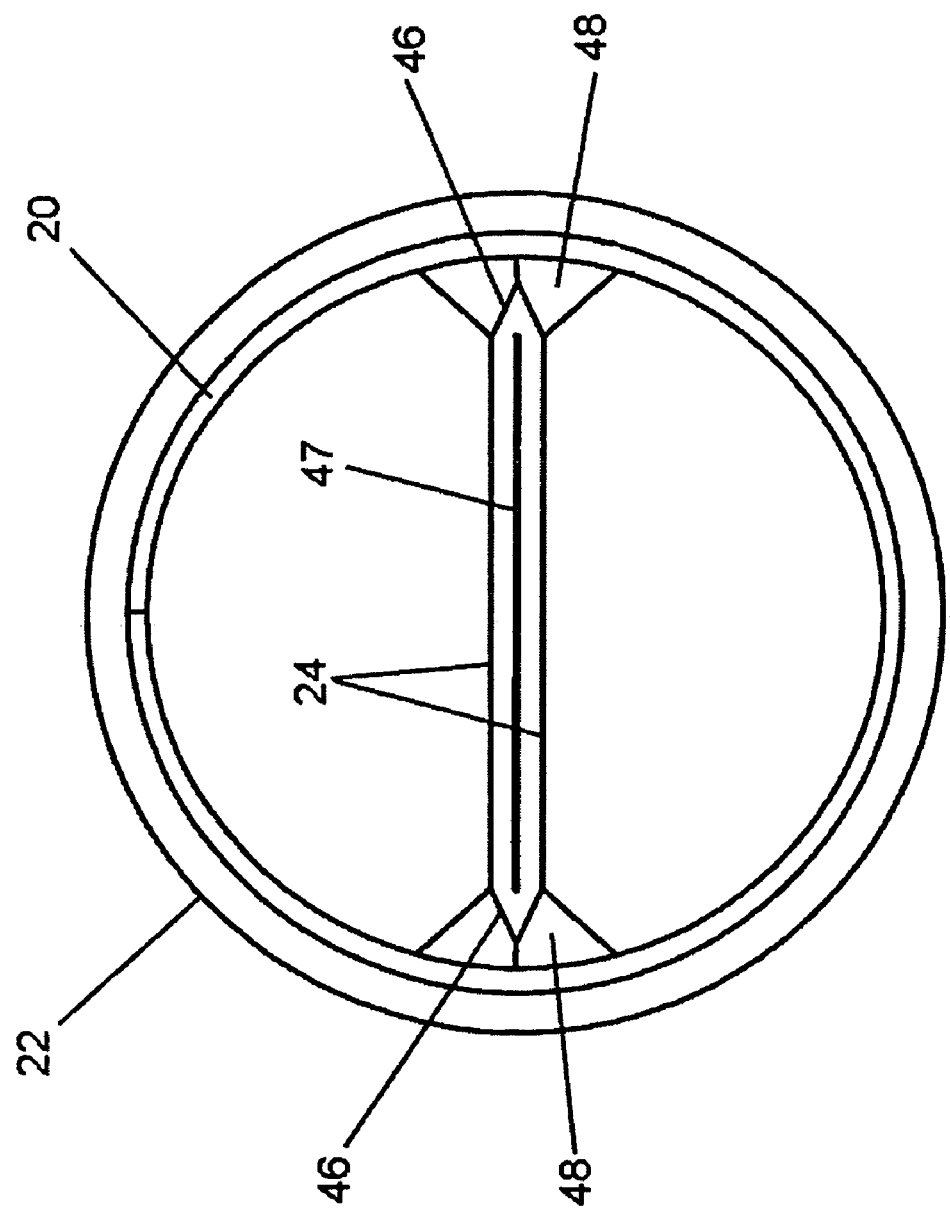
FIG. 7 is a section view to the duck-bill shaped elastomer valve piece of FIG. 3 taken along section lines 7-7 of FIG. 6.

The ability of the leaflets 24 of the valve piece 8 to flex and return to a closed or sealed condition at the parting line 47 of the leaflet edges 24 is enhanced by forming a concave curvature 42 at the lateral sides of the flanged end 22 and a convex curvature 43 at the front and rear sides of the flanged end 22 of the valve piece 8, reference FIGS. 4 through 6. Upon seating the groove 20 onto the flange 16 of the fitting 4, the compound curvatures 42 and 43 flatten against the flange 16 and flex the valve piece 8 to induce the edges of the leaflets 24 to flex and flatten in sealed abutment against each other.

The sealing action is enhanced by providing raised sidewall surfaces 44 along each leaflet edge 24. The surfaces 44 taper at the end of each leaflet 24 into a point or "beak" 46. The surfaces 44 increase the effective area of the seal action and the beaks 46 promote the flattening of the surfaces 44 and edges 24 against each other. The dimensions, taper angle and/or shape of the surfaces 44 and beak 46 can be varied to promote sealing and prevent leakage.

Figure 9:
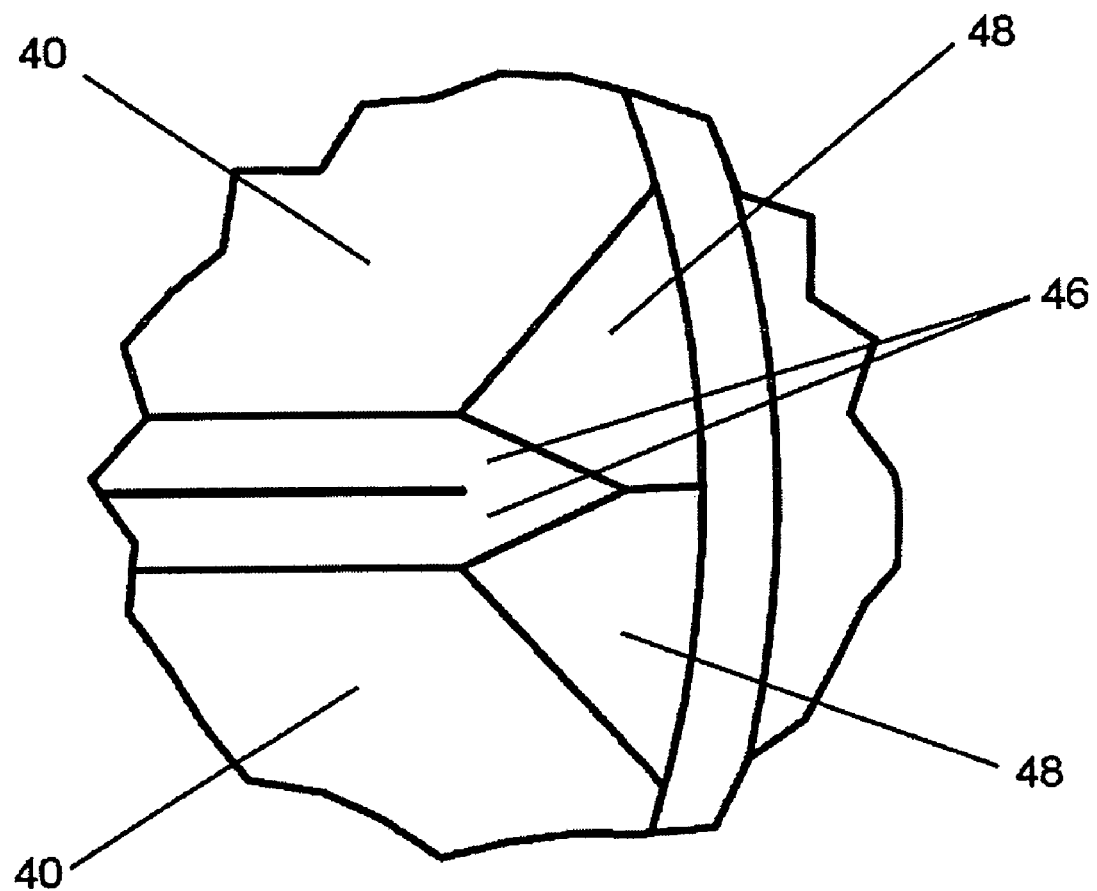
FIG. 9 is a detailed view in enlarged scale to the juncture of the slit and the edge wall of the valve piece of FIG. 8.
Figure 11:
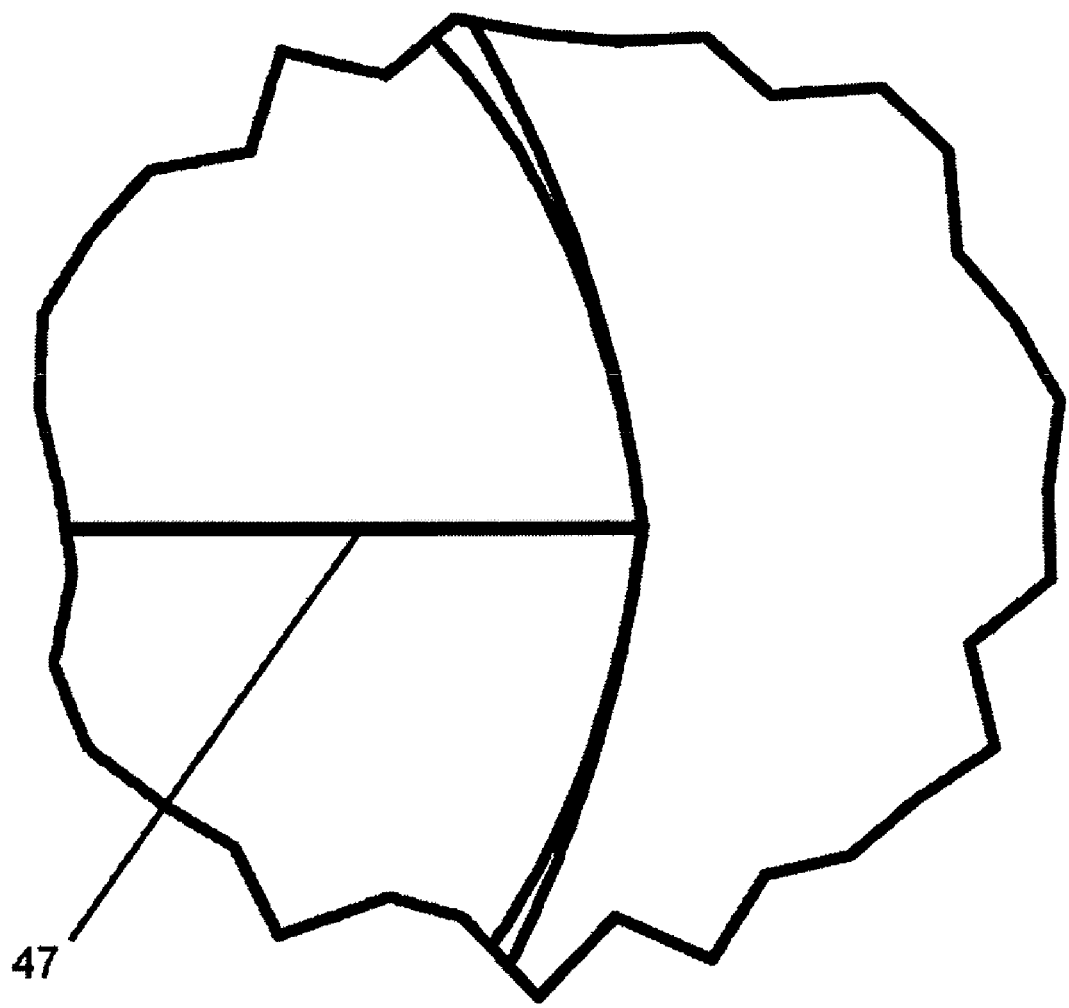
FIG. 11 is a detailed view in enlarged scale to the inside surface of the juncture of the slit and the edge wall of the valve piece of FIG. 10.

To further enhance the seal action, the tapered beaks 46 at the lateral ends of the parting line or slit 47 are extended downward at surfaces 48 formed into the sidewalls 40. The surfaces 48 define a V-shape and rise from the groove 20. The surfaces 48 project at back-to-back angles in the range of 25 to 30°. The enhanced material at the sidewall surfaces 48 accommodate normal open/closing flexion and assure a leak proof seal internally and externally. FIGS. 9 and 11 respectively show external and internal views to the closed slit or parting line 47.

Figure 8:
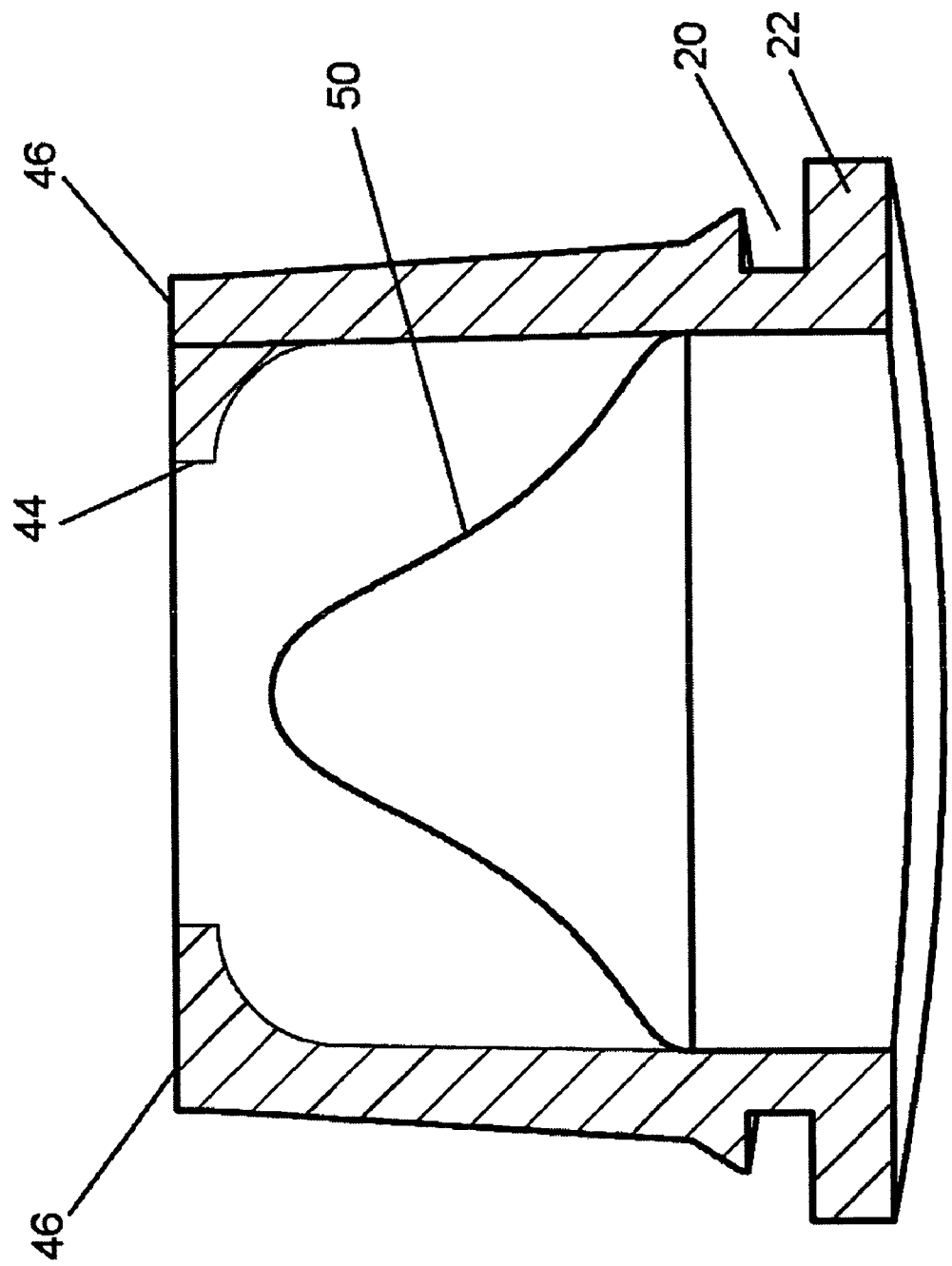
FIG. 8 is a top view to the duck-bill shaped elastomer valve piece of FIG. 3.
Figure 10:
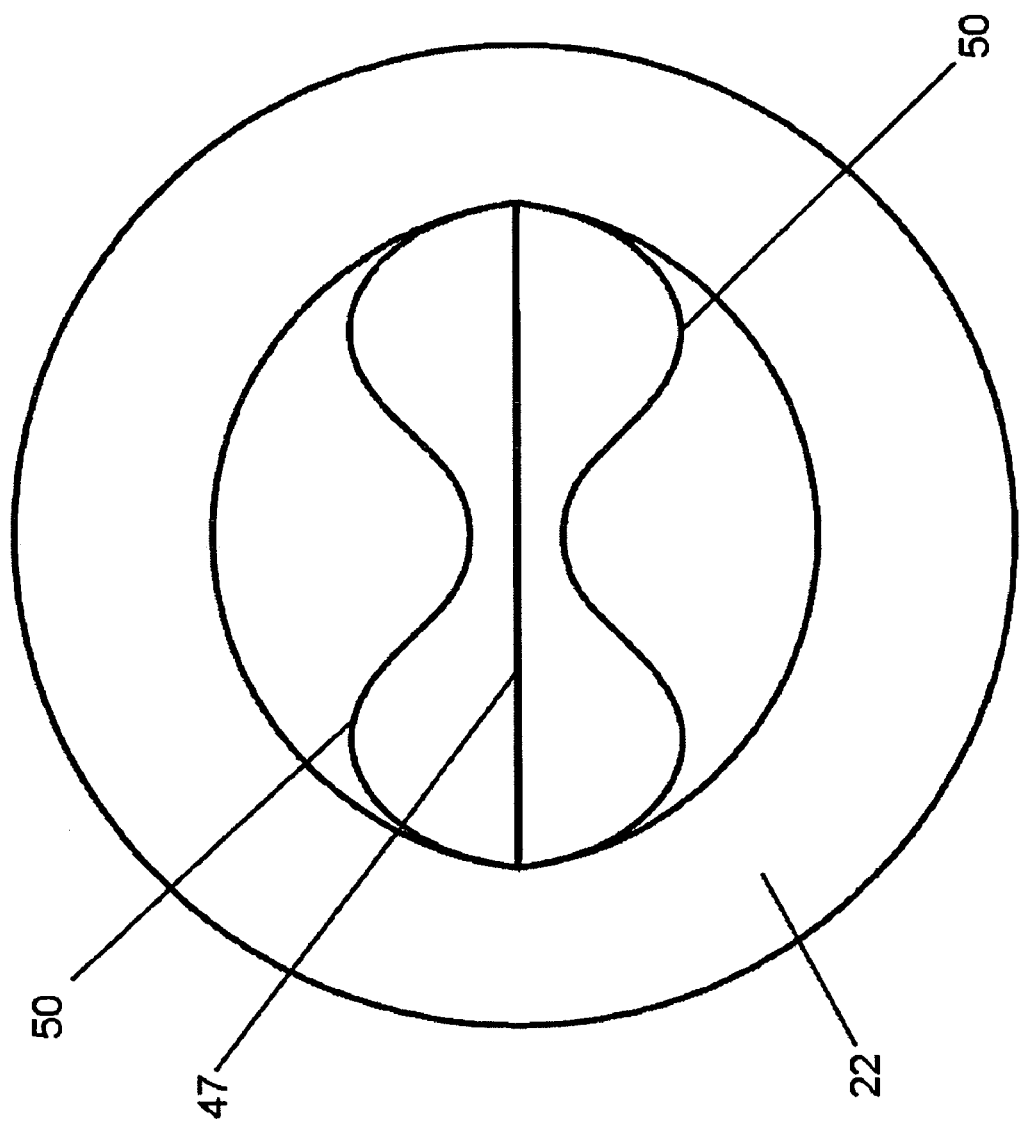
FIG. 10 is a bottom view to the duck-bill shaped elastomer valve piece of FIG. 3.

With attention to FIGS. 5, 8 and 10, the thickness of the sidewalls 40 is also tailored to be thicker at the lower, center portions of the sidewalls 40 in the space bounded by the profile line 50 as the sidewalls 40 rise from the end flange 22. An exemplary profile line for the valve piece 8 is shown at FIGS. 5, 8 and 10. The thickened sidewall profile promotes the sealing action at the edges 24 and surfaces 44 in the presence of back pressure on the sidewalls 40. The thickened sidewalls particularly counter acts sidewall compression or collapse in the presence of back pressure and stabilizes the ends of the leaflets in the beak regions 46. Collectively, the compound curvatures 42 and 43 of the base flange 22, the raised edge surfaces 44, the beak end surfaces 46 and 48, and the tailored thickness profiles at the sidewalls 40 assures a watertight sealing action at the parting line slit 47.

While the invention has been described with respect to a number of preferred constructions and considered improvements or alternatives thereto, still other constructions may be suggested to those skilled in the art. It is to be appreciated that selected ones of the foregoing features can also be used singularly or be arranged in different combinations to provide a variety of improved, detachable valve assemblies. For example, the valve piece can provide overlapping leaflets in a variety of shapes and numbers. The thickness profiles of the leaflets can be varied in a manner different from that disclosed. The base of the valve piece can be constructed without compound curvatures. The foregoing description should therefore be construed to include all those embodiments within the spirit and scope of the following claims which are intended to cover generic and specific features of the invention herein described.

What is claimed is:

1. A one way valve assembly comprising:
 a) a support fitting having a body and a through bore, wherein a flange radially extends inward along said bore; and
 b) an elastomer valve piece mounted within the bore of said support fitting, wherein a flow bore extends through said valve piece, wherein said valve piece comprises an annular base having a recessed groove in a tubular sidewall displaced above a bottom surface of said base, wherein said sidewall comprises first and second opposed, convex arcuate sidewall portions that extend from said groove and taper inward to a slit apex, wherein first and second leaflets having straight, flat interior seal surfaces extend from peripheral edges of said first and second sidewall portions to mate and seal against each other at said apex, wherein said first and second sidewall portions include regions of reducing tapering thickness as said first and second sidewall portions extend from said base to said first and second leaflets, wherein said first and second sidewall portions include flat intersecting exterior surface regions that terminate to define generally V-shaped surfaces at opposite ends of said apex, and wherein said bottom surface of said valve piece exhibits a convex curvature relative to an axis parallel to the slit apex and the seal surfaces and a concave curvature relative to an axis transverse to said seal surfaces such that upon seating said groove to the fitting flange said base flexes to lie flat to said base and said sealing surfaces of said first and second leaflets compress against each other and whereby said first and second resilient leaflets expand and contract to expose and permit the passage of a media through said flow bore under forward pressure and collapse and seal against each other upon release of said forward pressure.

2. A one way valve assembly comprising:
a) a support fitting having a body and a through bore and wherein a flange radially extends inward along a peripheral edge of said bore; and
b) an elastomer valve piece mounted within the bore of said support fitting, wherein a flow bore extends through said valve piece, wherein said valve piece comprises an annular base having a recessed groove in a tubular sidewall displaced above a bottom surface of said base, wherein said sidewall comprises first and second opposed, convex arcuate sidewall portions that extend from said groove and taper inward to a slit apex, wherein first and second leaflets having straight, flat interior seal surfaces extend from peripheral edges of said first and second sidewall portions to mate and seal against each other at said apex, wherein said first and second sidewall portions include regions of reducing tapering thickness as said first and second sidewall portions extend from said base to said first and second leaflets, and wherein said bottom surface of said valve piece exhibits a convex curvature relative to an axis parallel to the slit apex and said seal surfaces and a concave curvature relative to an axis transverse to the slit apex and said seal surfaces, such that upon seating said groove to the fitting flange said base flexes to lie flat to said fitting and said sealing surfaces of said first and second leaflets compress against each other and whereby said first and second resilient leaflets expand and contract to expose and permit the passage of a media through said flow bore under forward pressure and collapse and seal against each other upon release of said forward pressure.

3. A one way elastomer valve comprising:
a) an elastomer tubular valve body, wherein a flow bore extends through said valve body, wherein said valve body comprises an annular base having a bottom surface, wherein said sidewall comprises first and second opposed, convex arcuate sidewall portions that extend from said groove and taper inward to a slit apex, wherein first and second leaflets having straight, flat interior seal surfaces extend from peripheral edges of said first and second sidewall portions to mate and seal against each other at said apex, and wherein said bottom surface of said valve piece exhibits a convex curvature relative to an axis parallel to the slit apex and the seal surfaces and a concave curvature relative to an axis transverse to said seal surfaces such that upon seating said base to a support fitting said base flexes to lie flat to the fitting and said sealing surfaces of said first and second leaflets compress against each other and whereby said first and second resilient leaflets expand and contract to expose and permit the passage of a media through said flow bore under forward pressure and collapse and seal against each other upon release of said forward pressure.

4. An elastomer valve as set forth in claim 3 wherein said first and second sidewall portions include regions of reducing tapering thickness as said first and second sidewall portions extend from said base to said first and second leaflets.

5. An elastomer valve as set forth in claim 3 wherein said first and second sidewall portions include flat intersecting exterior surfaces that terminate to define V-shaped surfaces at opposite ends of said apex.

6. An elastomer valve as set forth in claim 3 including a support fitting having a body and a through bore, wherein a flange radially extends inward along the bore of said valve body and wherein said annular base has a recessed groove in the tubular sidewall displaced above a bottom surface of said base, such that upon seating said groove to the fitting flange said base flexes to lie flat to said fitting and said sealing surfaces of said first and second leaflets compress against each other.

* * * * *